United States Patent
Kobayashi et al.

(10) Patent No.: US 12,033,349 B2
(45) Date of Patent: Jul. 9, 2024

(54) INFORMATION PROCESSING DEVICE, INFORMATION PROCESSING METHOD, AND PROGRAM

(71) Applicant: KABUSHIKI KAISHA TOSHIBA, Tokyo (JP)

(72) Inventors: Daisuke Kobayashi, Tachikawa Tokyo (JP); Yuto Yamaji, Kawasaki Kanagawa (JP); Tomoyuki Shibata, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 214 days.

(21) Appl. No.: 17/446,613

(22) Filed: Aug. 31, 2021

(65) Prior Publication Data
US 2022/0156964 A1    May 19, 2022

(30) Foreign Application Priority Data
Nov. 19, 2020   (JP) .................................. 2020-192597

(51) Int. Cl.
*G06T 7/73* (2017.01)
*G06V 20/52* (2022.01)

(52) U.S. Cl.
CPC ................ *G06T 7/73* (2017.01); *G06V 20/52* (2022.01); *G06T 2207/30196* (2013.01)

(58) Field of Classification Search
CPC .... G06T 7/73; G06T 2207/3019; G06V 20/52
See application file for complete search history.

(56) References Cited

U.S. PATENT DOCUMENTS

| 11,531,311 B2 | 12/2022 | Matsumoto et al. |
| 2022/0028114 A1* | 1/2022 | Lee ........................... G06T 7/75 |

(Continued)

FOREIGN PATENT DOCUMENTS

| JP | 2011-76316 A | 4/2011 |
| JP | 2020-67939 A | 4/2020 |

(Continued)

OTHER PUBLICATIONS

Degadwala et al, ("Visual Social Distance Alert System Using Computer Vision & Deep Learning", Published in: 2020 4th International Conference on Electronics, Communication and Aerospace Technology (ICECA), pp. 15512-1515) (Year: 2020).*

(Continued)

*Primary Examiner* — Amara Abdi
(74) *Attorney, Agent, or Firm* — Finnegan, Henderson, Farabow, Garrett & Dunner, LLP (57) ABSTRACT

According to one embodiment, an information processing device according to an embodiment includes an acquisition unit, a detection unit, and a calculation unit. The acquisition unit acquires image data in which an image of a space where a plurality of specific objects exist is captured. The detection unit detects a position and an orientation of each of the plurality of specific objects included in the image data in the space. The calculation unit calculates, for any evaluation target object of the plurality of specific objects, a close-contact evaluation value indicating a degree of close contact between the evaluation target object and one or a plurality of other specific objects other than the evaluation target object among the plurality of specific objects, based on the position and the orientation of each of the plurality of specific objects.

20 Claims, 7 Drawing Sheets

(56) References Cited

U.S. PATENT DOCUMENTS

2022/0028535 A1\* 1/2022 Ryan .................... G06V 30/194
2022/0034542 A1\* 2/2022 Peters ................. F24F 11/0001

FOREIGN PATENT DOCUMENTS

JP          2020067939    \* 4/2020   ............... A61B 5/00
WO    WO 2020/044826 A1    3/2020

OTHER PUBLICATIONS

Yang et al, ("A Vision based Social Distancing and Critical Density Detection Syste1n for COVID 19", the Ohio university Columbus, OH 43210, USA, JUl. 8, 2020, pp. 1-9) (Year: 2020).\*
Dongfang Yang et al., "A Vision-based Social Distancing and Critical Density Detection System for COVID-19," arXiv:2007.03578, 10 pages (Jul. 8, 2020).

\* cited by examiner

INFORMATION PROCESSING DEVICE, INFORMATION PROCESSING METHOD, AND PROGRAM

INCORPORATION BY REFERENCE RELATED APPLICATION

This application is based upon and claims the benefit of priority from Japanese Patent Application No. 2020-192597, filed Nov. 19, 2020, the entire contents of which are incorporated herein by reference. Any and all applications for which a foreign or domestic priority claim is identified in the Application Data Sheet as filed with the present application are hereby incorporated by reference under 37 CFR 1.57.

FIELD

Embodiments described herein relate generally to an information processing device, an information processing method, and a program.

BACKGROUND

In order to prevent virus infection from being spread, it is important to have a physical distance between persons. In order to reduce a virus infection risk, there is a demand for a technique for detecting a close contact between persons from image data captured by a monitoring camera in a store.

There is a technique of the related art for detecting a position of the head of a person from an image and calculating a density of persons based on a head density per unit area. Further, there is also known a technique for monitoring whether there is a physical distance between persons by calculating a distance between the persons based on an overhead view obtained by calibration of a camera.

However, even when a distance between persons is reduced, a risk due to droplet infection changes depending on when the persons face back each other or when the persons face each other. Therefore, the technique of the related art could not accurately present an evaluation value corresponding to the risk of droplet infection.

Examples of related art include JP-A-2011-76316 and Dongfang Yang, et al. "A Vision-based Social Distancing and Critical Density Detection System for COVID-19", July 2020, arXiv:2007.03578.

DETAILED DESCRIPTION

Embodiments provide an information processing device, an information processing method, and a program for accurately calculating a degree of close contact.

In general, according to one embodiment, an information processing device according to an embodiment includes an acquisition unit, a detection unit, and a calculation unit. The acquisition unit acquires image data in which an image of a space where a plurality of specific objects exist is captured. The detection unit detects a position and an orientation of each of the plurality of specific objects included in the image data in the space. The calculation unit calculates, for any evaluation target object of the plurality of specific objects, a close-contact evaluation value indicating a degree of close contact between the evaluation target object and one or a plurality of other specific objects other than the evaluation target object among the plurality of specific objects, based on the position and the orientation of each of the plurality of specific objects.

Hereinafter, an information processing system 10 according to an embodiment will be described with reference to the drawings. The information processing system 10 calculates a close-contact evaluation value indicating a degree of close contact of one or a plurality of other persons for an evaluation target person. Then, the information processing system 10 visualizes a risk of virus infection caused by droplets coming out of a mouth by displaying information in accordance with the close-contact evaluation value.

First Embodiment

Figure 1:
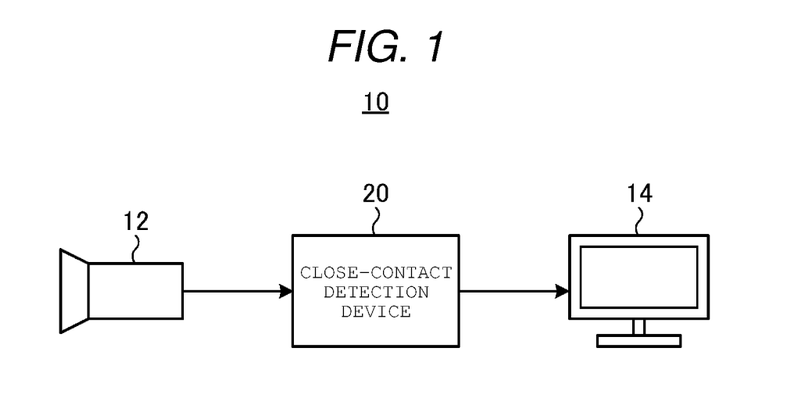
FIG. 1 is a diagram illustrating a configuration of an information processing system.

FIG. 1 is a diagram illustrating a configuration of the information processing system 10. The information processing system 10 includes a camera 12, a display device 14, and a close-contact detection device 20.

The camera 12 images a space where a plurality of persons (a plurality of specific objects) exist. For example, the camera 12 images a space such as a store, a school, a public facility, or a train station from a position viewed from above. The camera 12 captures images at regular time intervals.

The display device 14 displays image data. For example, the display device 14 is monitored by an administrator or the like of the information processing system 10. Further, the display device 14 may be a remote device connected to the close-contact detection device 20 through a network.

The close-contact detection device 20 acquires image data from the camera 12. The close-contact detection device 20 specifies any or all of a plurality of persons existing in a space as evaluation target persons based on the acquired image data and calculates a close-contact evaluation value for each of the specified evaluation target persons (evaluation target objects).

The close-contact evaluation value indicates a degree of close contact of one or a plurality of other persons (one or a plurality of other specific objects) for the evaluation target person. For example, the close-contact evaluation value indicates a degree of close contact between a surface on a face side of the head of one or each of the plurality of other persons and a surface on a face side of the head of the evaluation target person. In this case, the close-contact evaluation value corresponds to a risk that the evaluation target person is virus-infected by droplets from a mouth of one or each of the plurality of other persons.

The close-contact detection device 20 superimposes information indicating a corresponding close-contact evaluation value, on a position corresponding to each of the plurality of persons in image data captured by the camera 12. The information indicating the close-contact evaluation value is, for example, an image in which a display content changes according to a magnitude of the close-contact evaluation value. For example, the information indicating the close-contact evaluation value may be an image of which color, density, or shape changes according to a corresponding close-contact evaluation value. Then, the close-contact detection device 20 causes the display device 14 to display the image data on which the information indicating the close-contact evaluation value is superimposed.

The information processing system 10 can visually present a person having a high risk to be virus-infected by droplets among a plurality of persons existing in a space to an observer who monitors the display device 14.

Figure 2:
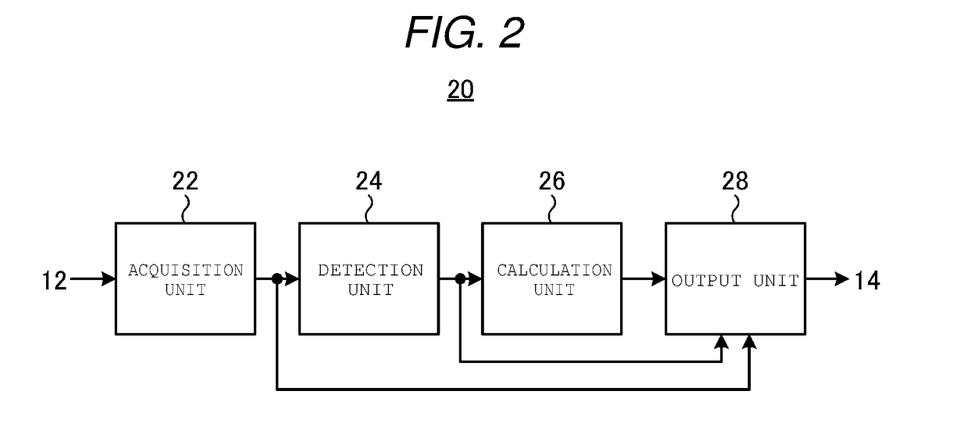
FIG. 2 is a diagram illustrating a configuration of a close-contact detection device.

FIG. 2 is a diagram illustrating a configuration of the close-contact detection device 20. The close-contact detection device 20 is implemented by, for example, a close-contact detecting application program executed by an information processing device.

The close-contact detection device 20 includes an acquisition unit 22, a detection unit 24, a calculation unit 26, and an output unit 28.

The acquisition unit 22 acquires image data in which an image of a space where a plurality of persons exist is captured from the camera 12. The image data may be a color image or a monochrome image. The image data may be a stereo image.

The detection unit 24 detects each of a plurality of persons included in the image data. For example, the detection unit 24 detects a person included in the image data by using an object detection method using pattern matching or a neural network. In the present embodiment, the detection unit 24 detects the head of each of the plurality of persons. For example, the detection unit 24 estimates keypoints of a skeleton of a person and detects the head by using the estimated keypoints.

Furthermore, the detection unit 24 detects a position and an orientation of each of the plurality of detected persons in a space. In the present embodiment, the detection unit 24 detects a position of the head and an orientation (for example, a direction in which a face is facing) of the head, in each of the plurality of detected persons. For example, the detection unit 24 detects coordinates of the position of the head on an overhead view. Specifically, the detection unit 24 detects the position of the head by converting a pixel position of the head of the image data into a position on the overhead view. Furthermore, the detection unit 24 detects an orientation of the head on the overhead view. Specifically, the detection unit 24 detects the orientation of the head by using a normal vector of a straight line connecting two eyes of the head, a normal vector connecting keypoints of two shoulders, and the like. Further, for example, detection unit 24 may detect coordinates of a three-dimensional space of a position of the head and may detect an orientation of the head in the three-dimensional space.

The calculation unit 26 specifies any or all of the plurality of detected persons as evaluation target persons. For each of the evaluation target persons, the calculation unit 26 calculates a close-contact evaluation value indicating a degree of close contact between one or a plurality of other persons other than the evaluation target persons of the plurality of persons, and the evaluation target person, based on the position and the orientation of each of the plurality of persons. For example, the calculation unit 26 calculates a close-contact evaluation value based on the position and the orientation of each of the head of each of the plurality of persons, for each of the evaluation target persons.

The output unit 28 receives image data from the acquisition unit 22. The output unit 28 receives a position and an orientation on the overhead view of each of the head of each of the plurality of persons detected by the detection unit 24. Furthermore, the output unit 28 acquires a close-contact evaluation value, which is calculated by the calculation unit 26, for each evaluation target person.

The output unit 28 causes the display device 14 to display information in accordance with the close-contact evaluation value of each evaluation target person together with the image data. For example, the output unit 28 generates an evaluation object which is an image in which a display content changes according to the close-contact evaluation value. For example, the output unit 28 generates an evaluation object of which color, density, or shape changes according to the close-contact evaluation value. The output unit 28 superimposes the generated evaluation object on a position of the head of a corresponding evaluation target person in the image data acquired from the camera 12. Then, the output unit 28 causes the display device 14 to display the image data on which the evaluation object is superimposed.

Further, the output unit 28 generates a range object which is an image indicating a range of a predetermined distance from the head, for each evaluation target person. For example, the predetermined distance is a range that droplets from a mouth reach. The output unit 28 generates the range object converted to indicate a distance range of the overhead view in a position of the head of the evaluation target person. Then, the output unit 28 causes the display device 14 to display the image data on which the generated range object is superimposed.

Further, the output unit 28 generates a direction object which is an image indicating an orientation of the head, for each evaluation target person. For example, the orientation of the head is a direction in which droplets from the mouth are estimated to fly most. Then, the output unit 28 causes the display device 14 to display image data on which the direction object converted to display an orientation in a space is superimposed, in a position of the head of an evaluation target person. For example, the output unit 28 superimposes the range object on the image data by converting the range of the predetermined distance indicated by the overhead view into two-dimensional coordinates of the image data captured by the camera 12.

Figure 3:
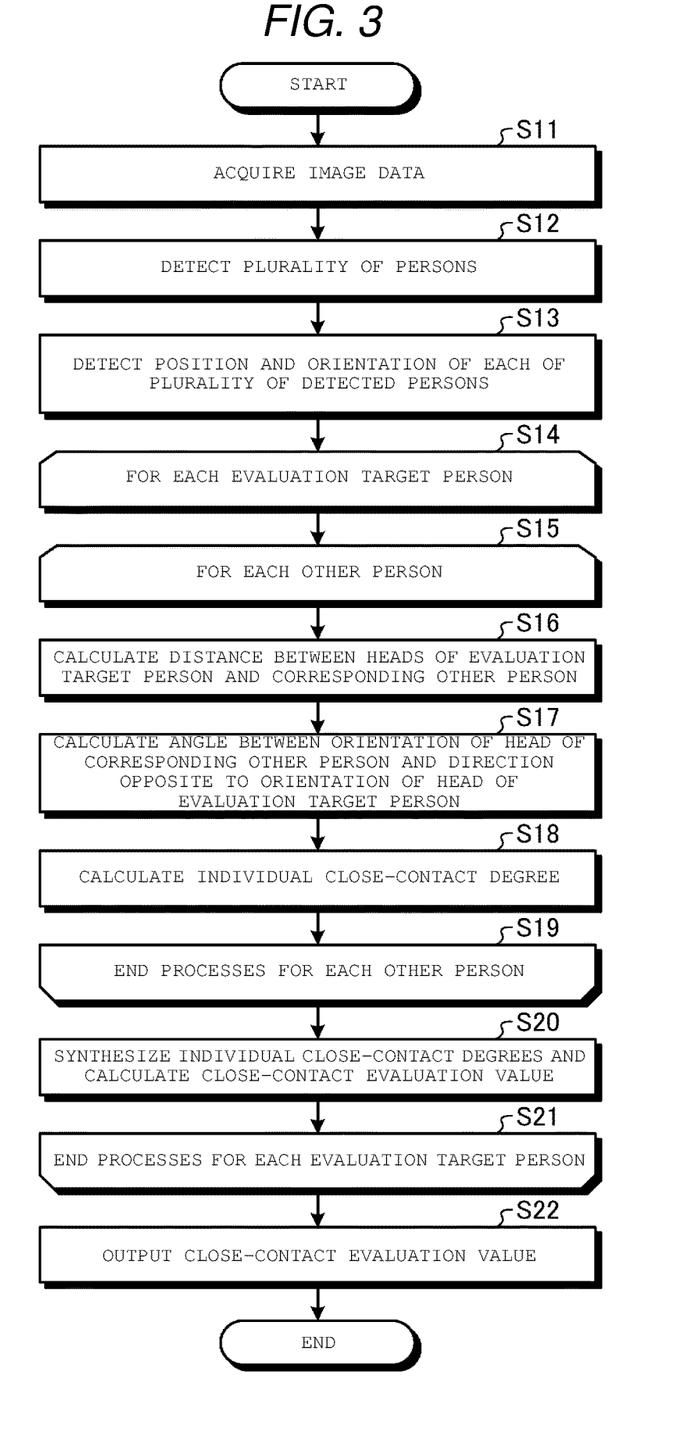
FIG. 3 is a flowchart illustrating a processing flow of the close-contact detection device according to a first embodiment.
Figure 4:
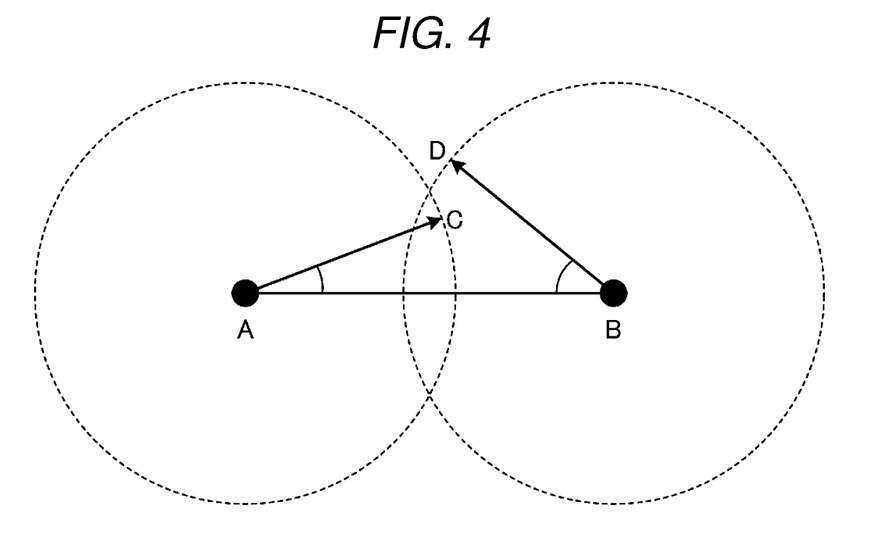
FIG. 4 is a diagram illustrating a vector for calculating an angle parameter.

FIG. 3 is a flowchart illustrating a processing flow of the close-contact detection device 20 according to the first embodiment. FIG. 4 is a diagram illustrating a vector for calculating an angle parameter.

First, in S11, the close-contact detection device 20 acquires image data in which an image of a space where a plurality of persons exist is captured from the camera 12. Subsequently, in S12, the close-contact detection device 20 detects each of the plurality of persons included in the image data.

Subsequently, in S13, the close-contact detection device 20 detects a position and an orientation of each of the plurality of detected persons in a space. In the present embodiment, the close-contact detection device 20 detects a position of the head and an orientation (for example, a direction in which a face is facing) of the head in each of the plurality of detected persons.

Subsequently, the close-contact detection device 20 performs processes of S15 to S20 for each evaluation target person (a loop process between S14 and S21). For example, the close-contact detection device 20 may subsequently select each of a plurality of persons included in the image data as an evaluation target person. Further, for example, the close-contact detection device 20 may select a specific one or each of a plurality of persons from among the plurality of persons included in the image data as the evaluation target person.

In the loop process between S14 and S21, the close-contact detection device 20 performs processes of S16 to S18 for each of other persons (a loop process between S15 and S19). The other persons are not the evaluation target person of the plurality of persons included in the image data.

In S16, the close-contact detection device 20 calculates a distance between the head of the evaluation target person and the head of a corresponding other person. For example, close-contact detection device 20 calculates the distance based on a position of the head of the evaluation target person in the overhead view and a position of the head of the corresponding other person in the overhead view.

Subsequently, in S17, the close-contact detection device 20 calculates an angle between the orientation of the head of the corresponding other person and a direction opposite to the orientation of the head of the evaluation target person. For example, the orientation of the head of the evaluation target person is, for example, a direction in which a face is facing. Thus, the angle is reduced when a face of the evaluation target person and a face of another person face each other and increases as the persons face opposite directions.

Subsequently, in S18, the close-contact detection device 20 calculates an individual close-contact degree indicating a degree of close contact between the head of the evaluation target person and a corresponding other person, based on the calculated distance and angle.

Here, the close-contact detection device 20 increases the individual close-contact degree as the distance between the head of the evaluation target person and the head of the corresponding other person is short. Further, the close-contact detection device 20 increases the individual close-contact degree as an orientation of the head of the corresponding other person coincides with a direction opposite to an orientation of the head of the evaluation target person.

For example, the close-contact detection device 20 calculates a distance parameter of which value increases as the distance between the head of the evaluation target person and the head of the corresponding other person is reduced. Further, the close-contact detection device 20 calculates an angle parameter of which value increases as an orientation of the head of the corresponding other person coincides with a direction opposite to an orientation of the head of the evaluation target person. Then, as represented by equation (1), the close-contact detection device 20 calculates the individual close-contact degree by multiplying or adding the distance parameter and the angle parameter.

$$\text{Individual close-contact degree} = \text{distance parameter} \times \text{angle parameter} \quad (1)$$

For example, the distance parameter is represented as in equation (2) by using a Euclidean distance between a vector A from an original point to coordinates of the evaluation target person and a vector B from the original point to coordinates of another person, and a distance threshold $T_{distance}$.

$$\text{Distance Parameter} = \begin{cases} T_{distance} - \|A - B\| & \text{if } T_{distance} > \|A - B\| \\ 0 & \text{otherwise} \end{cases} \quad (2)$$

Further, as illustrated in FIG. 4, the angle parameter increases as an angle between a vector AB from the evaluation target person to another person and a vector AC toward the head of the evaluation target person, and an angle between a vector BA from another person to the evaluation target person and a vector BD toward the head of another person are reduced. For example, the angle parameter is represented as in equation (3) by using a cosine similarity and the threshold $T_{degree}$.

$$\text{Angle Parameter} = \begin{cases} \dfrac{AB \cdot AC}{\|AB\|\|AC\|} + \dfrac{BA \cdot BD}{\|BA\|\|BD\|} - \\ \quad T_{degree} \text{ if } T_{degree} < \\ \quad \dfrac{AB \cdot AC}{\|AB\|\|AC\|} + \dfrac{BA \cdot BD}{\|BA\|\|BD\|} \\ 0 \text{ otherwise} \end{cases} \quad (3)$$

It is noted that the close-contact detection device 20 is not limited to the calculation method of equation (1) and may calculate the individual close-contact degree by using another method.

Subsequently, in S19, when the close-contact detection device 20 ends the processes of S16 to S18 for all the other persons, the process proceeds to S20.

In S20, the close-contact detection device 20 synthesizes the individual close-contact degrees calculated for one or each of a plurality of other persons and calculates a close-contact evaluation value for the evaluation target person. For example, the close-contact detection device 20 calculates the close-contact evaluation value by adding all the individual close-contact degrees calculated for one or each of a plurality of other persons.

Subsequently, in S21, when the close-contact detection device 20 ends the processes of S15 to S20 for all the evaluation target persons, the process proceeds to S22.

Subsequently, in S22, the close-contact detection device 20 outputs the calculated close-contact evaluation value for each of all the evaluation target persons. For example, the close-contact detection device 20 superimposes an evaluation object indicating a corresponding close-contact evaluation value on a position corresponding to each of a plurality of persons in the image data captured by the camera 12. Then, the close-contact detection device 20 causes the display device 14 to display the image data in which an evaluation object is superimposed on a position corresponding to each of a plurality of persons.

When the process of S22 ends, the close-contact detection device 20 ends the present flow. It is noted that the close-contact detection device 20 performs the processes of S11 to S22, for example, at regular time intervals and updates display at regular time intervals.

By calculating a close-contact evaluation value, the close-contact detection device 20 can provide an observer with a risk that an evaluation target person is virus-infected by droplets coming out of the mouth of another person.

Figure 5:
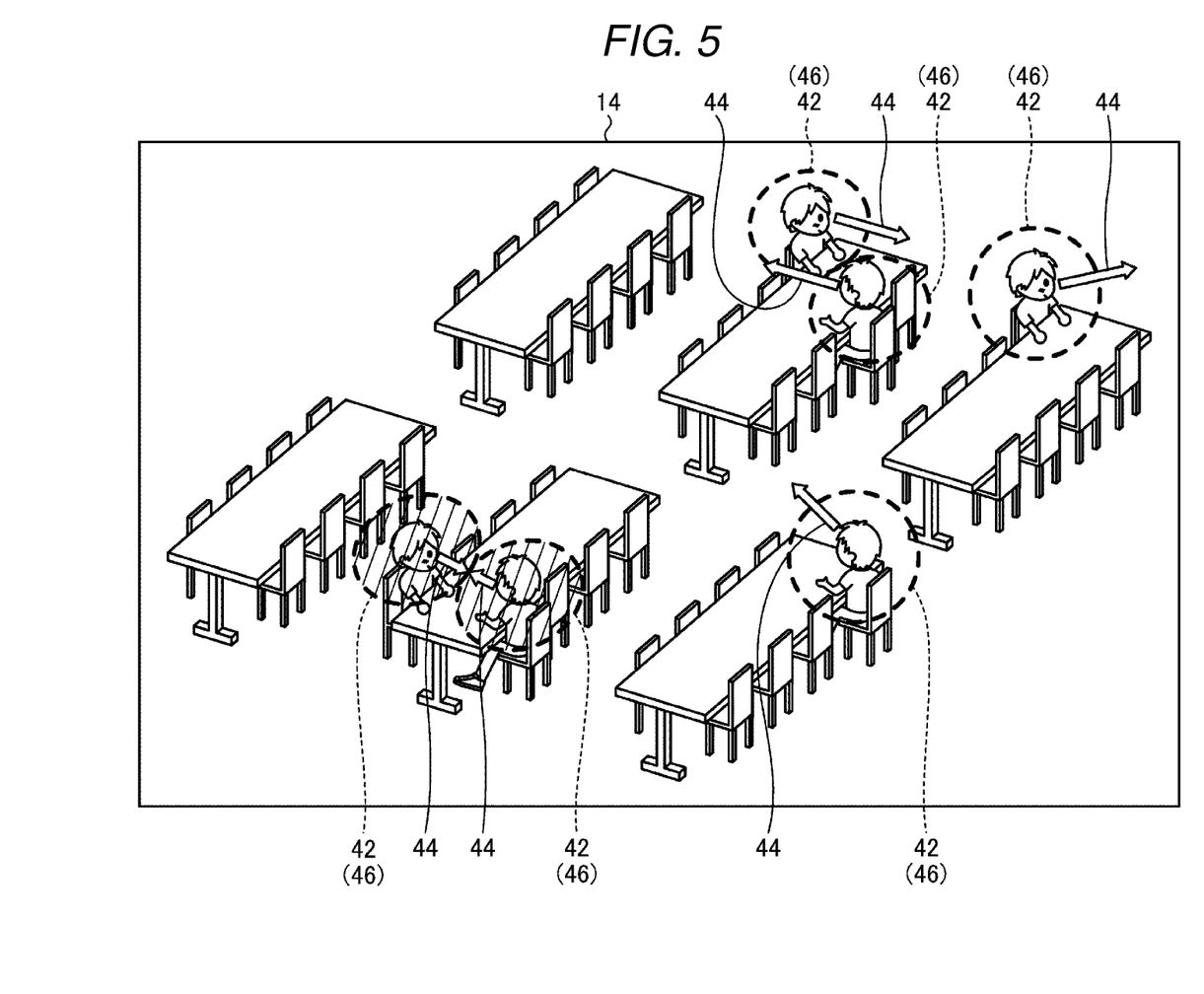
FIG. 5 is a view illustrating an example of an image displayed on a display device.

FIG. 5 is a view illustrating an example of an image displayed on the display device 14. The close-contact detection device 20 causes the display device 14 to display image the data output from the camera 12, for example, as illustrated in FIG. 5.

Furthermore, the close-contact detection device 20 causes the display device 14 to display a range object 42 and a direction object 44 corresponding to one or each of a plurality of evaluation target persons. More specifically, the close-contact detection device 20 causes the display device 14 to display image data in which the range object 42 and the direction object 44 are superimposed on a position of the head of the evaluation target person.

The range object 42 is an image indicating a range of a predetermined distance from the head about the position of the head of the evaluation target person in the image data. By displaying the range object 42, the close-contact detection device 20 can visually provide, for example, an observer with a range in which droplets coming out of the mouth of the evaluation target person fly.

The direction object 44 is an image indicating an orientation of the head of the evaluation target person. By displaying the direction object 44, the close-contact detection device 20 can visually provide, for example, the observer with a direction in which the droplets from the mouth of the evaluation target person fly.

Furthermore, the close-contact detection device 20 causes the display device 14 to display an evaluation object 46 corresponding to one or each of a plurality of evaluation target persons. More specifically, the close-contact detection device 20 causes the display device 14 to display image data in which the evaluation object 46 is superimposed on the position of the head of the evaluation target person.

The evaluation object 46 is an image in which a display content changes according to a corresponding close-contact evaluation value. In the example of FIG. 5, the evaluation object 46 is an image of an inner part of the range object 42. The evaluation object 46 is, for example, an image of which color or color density changes according to a corresponding close-contact evaluation value. For example, the evaluation object 46 may be an image of which density is increased as the close-contact evaluation value increases. Further, for example, the evaluation object 46 may be an image of which color changes such that the larger the close-contact evaluation value, the closer to red, and the smaller the close-contact evaluation value, the closer to blue. By displaying the evaluation object 46, the close-contact detection device 20 can visually provide an observer with a risk that the evaluation target person is virus-infected by droplets coming out of the mouth of another person.

Second Embodiment

Next, an information processing system 10 according to a second embodiment will be described. The information processing system 10 according to the second embodiment has substantially the same functions and configurations as in the first embodiment described with reference to FIGS. 1 to 5. Thus, in describing the second embodiment, a member and a functional block having the same function and configuration described in the first embodiment are given by the same reference numerals, and detailed descriptions thereof are omitted except for differences therebetween.

Figure 6:
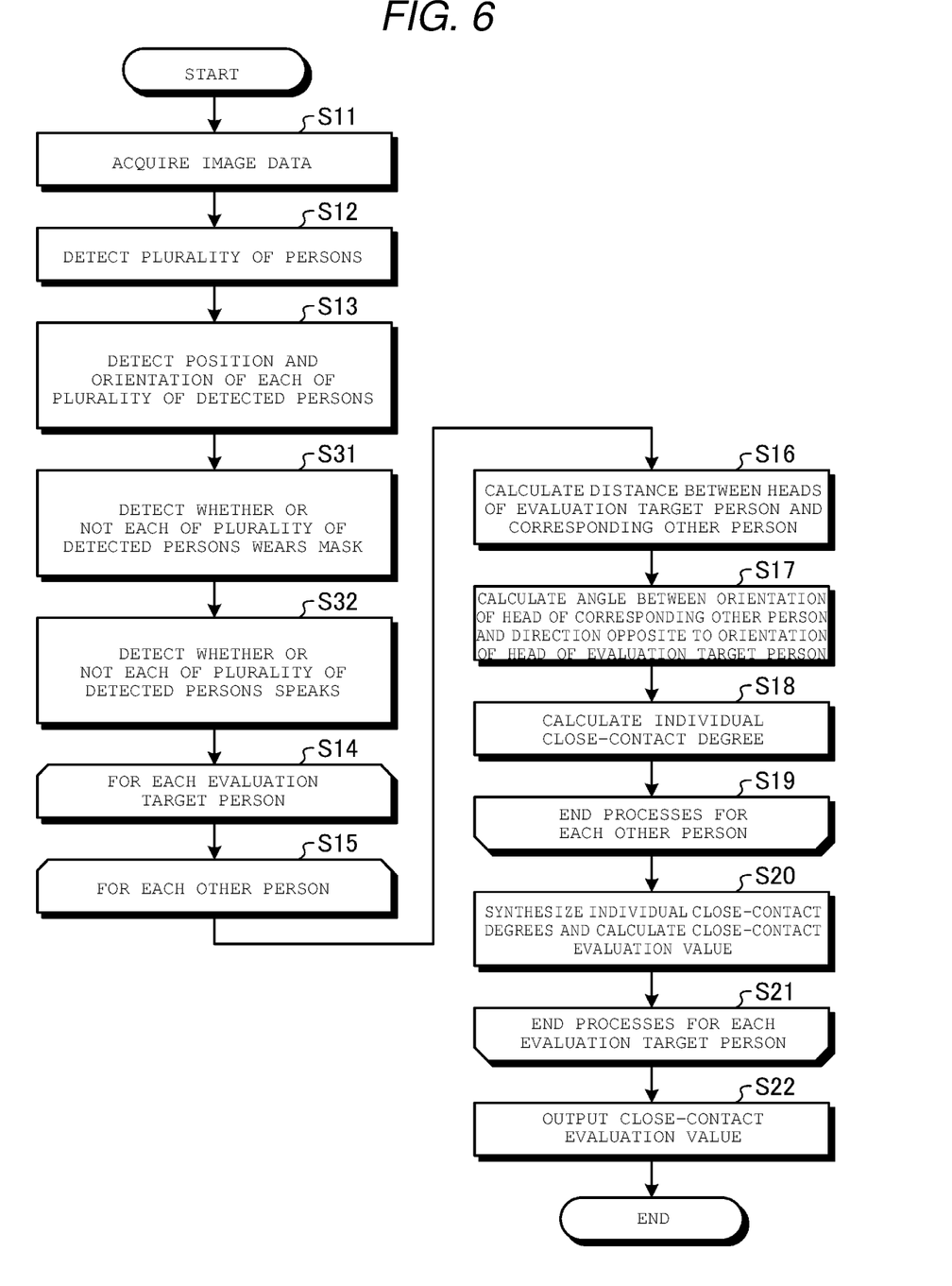
FIG. 6 is a flowchart illustrating a processing flow of a close-contact detection device according to a second embodiment.

FIG. 6 is a flowchart illustrating a processing flow of a close-contact detection device 20 according to the second embodiment.

The close-contact detection device 20 according to the second embodiment proceeds to a process of S31 after S13. In S31, the close-contact detection device 20 further detects whether each of a plurality of detected persons wears a mask. For example, the close-contact detection device 20 detects whether the mask is worn by using a method using pattern matching or a neural network. The close-contact detection device 20 proceeds to a process of S32 after S31.

Subsequently, in S32, the close-contact detection device 20 further detects whether each of the plurality of detected persons speaks. For example, the close-contact detection device 20 may detect whether a conversation is made. For example, the close-contact detection device 20 detects whether a voice is output by using a method using pattern matching or a neural network.

The close-contact detection device 20 performs a loop process of S14 to S21 following S32.

Here, in S18, the close-contact detection device 20 increases an individual close-contact degree as a distance between the head of an evaluation target person and the head of a corresponding other person is reduced. Further, the close-contact detection device 20 increases the individual close-contact degree as an orientation of the head of the corresponding other person coincides with a direction opposite to an orientation of the head of the evaluation target person.

Furthermore, in S18, the close-contact detection device 20 increases the individual close-contact degree when the corresponding other person does not wear the mask, compared with when the corresponding other person wears the mask. Furthermore, in S18, the close-contact detection device 20 increases the individual close-contact degree when the corresponding other person speaks, compared with when the corresponding other person does not speak. Thereby, the close-contact detection device 20 can increase the individual close-contact degree when there is a high risk of virus infection caused by droplets coming out of the mouth.

For example, the close-contact detection device 20 calculates a mask parameter of which value increases when the corresponding other person does not wear the mask, compared with when the corresponding other person wears the mask. Furthermore, for example, the close-contact detection device 20 calculates a vocalization parameter of which value is great when the corresponding other person speaks, compared with when the corresponding other person does not speak. Then, as represented by equation (4), the close-contact detection device 20 calculates the individual close-contact degree by multiplying or adding a distance parameter, an angle parameter, the mask parameter, and the vocalization parameter.

$$\text{Individual close-contact degree} = \text{distance parameter} \times \text{angle parameter} \times \text{mask parameter} \times \text{vocalization parameter} \quad (4)$$

For example, the mask parameter is represented as follows by using a degree of confidence $S_{mask}$ and a threshold $T_{mask}$ estimated by a method using pattern matching or a neural network.

$$\text{Mask Parameter} = \begin{cases} T_{mask} - S_{mask} & \text{if } T_{mask} > S_{mask} \\ 0 & \text{otherwise} \end{cases} \quad (5)$$

For example, the vocalization parameter is represented as follows by using a degree of confidence $S_{voice}$ and a threshold $T_{voice}$ estimated by using a method using pattern matching or a neural network.

$$\text{Vocalization Parameter} = \begin{cases} S_{voice} - T_{voice} & \text{if } T_{voice} < S_{voice} \\ 0 & \text{otherwise} \end{cases} \quad (6)$$

It is noted that the close-contact detection device 20 is not limited to the calculation method of equation (4) and may calculate the individual close-contact degree by using another method.

By calculating a close-contact evaluation value, the close-contact detection device 20 can provide an observer with a risk that an evaluation target person is virus-infected by droplets coming out of the mouth of another person.

Third Embodiment

Next, an information processing system 10 according to a third embodiment will be described. The information processing system 10 according to the third embodiment has substantially the same functions and configurations as in the second embodiment described with reference to FIG. 6. Thus, in describing the third embodiment, a member and a functional block having the same function and configuration described in the second embodiment are given by the same reference numerals, and detailed descriptions thereof are omitted except for differences therebetween.

Figure 7:
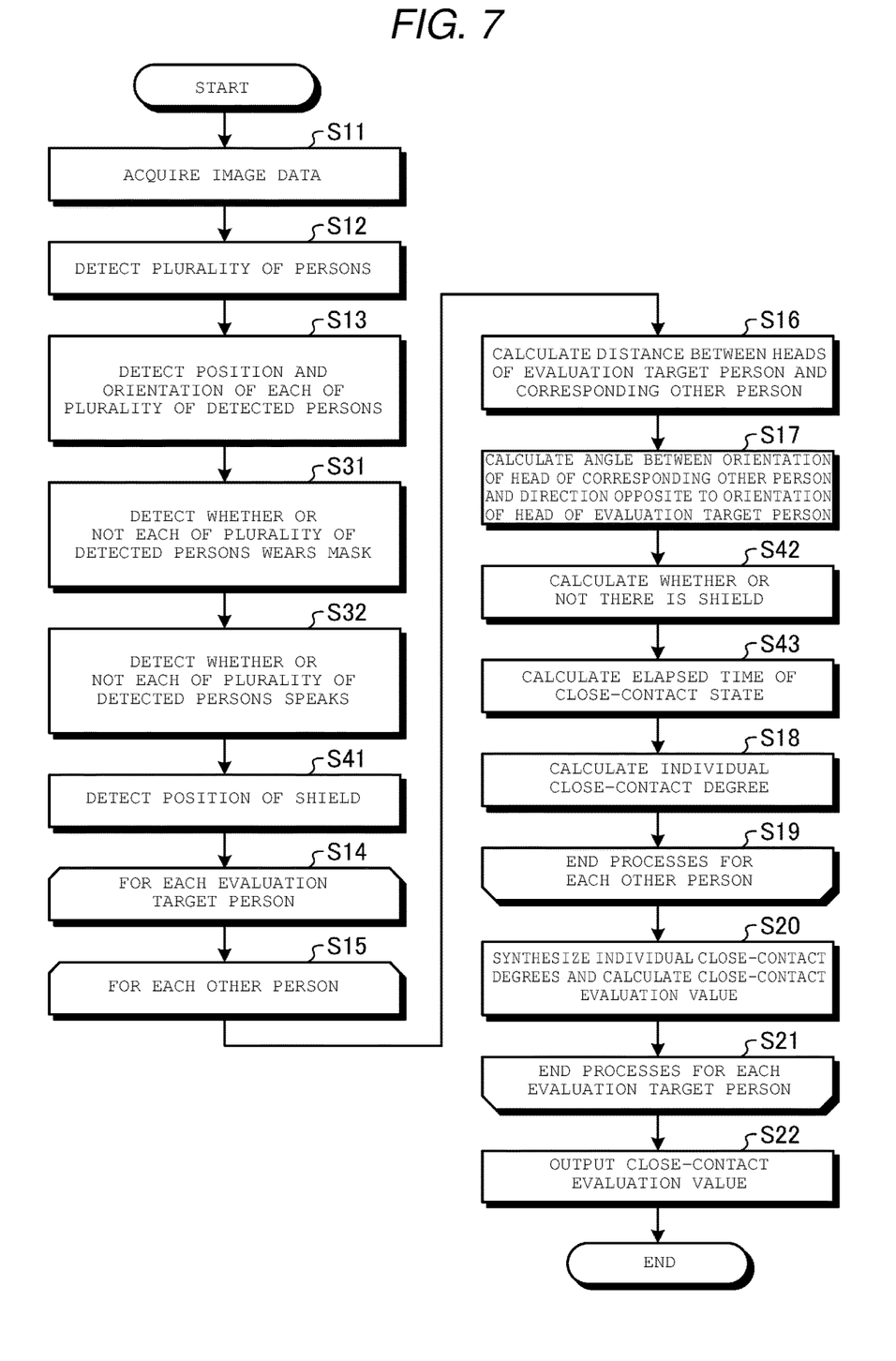
FIG. 7 is a flowchart illustrating a processing flow of a close-contact detection device according to a third embodiment.

FIG. 7 is a flowchart illustrating a processing flow of a close-contact detection device 20 according to the third embodiment.

The close-contact detection device 20 according to the third embodiment proceeds to a process of S41 after S32. In S41, the close-contact detection device 20 detects a position of a shield which is included in image data and shields droplets from a mouth. The shield is, for example, a transparent plate or the like erected in a vertical direction. The shield can shield droplets from the mouth of a person and prevent the droplets from reaching another person. For example, the close-contact detection device 20 detects a position of the shield from the image data by using an object detection method using pattern matching or a neural network. The close-contact detection device 20 performs a loop process of S14 to S21 following S41.

Further, the close-contact detection device 20 according to the third embodiment proceeds to a process of S42 after S17. In S42, close-contact detection device 20 calculates where or not there is a shield between a position of the head of a corresponding other person and a position of the head of an evaluation target person. For example, the close-contact detection device 20 calculates whether there is the shield detected in S41 on a straight line connecting the position of the head of the other person to the position of the head of the evaluation target person, in an overhead view.

Subsequently, in S43, the close-contact detection device 20 calculates a duration of a close-contact state at the present time. The close-contact state is a state where the position of the head of the corresponding other person is within a predetermined distance from the position of the head of the evaluation target person, and an orientation of the head of the corresponding other person is within a predetermined angle range with respect to a direction opposite to an orientation of the head of the evaluation target person. That is, the close-contact state is a state where there is a high risk that the evaluation target person is virus-infected by droplets coming out of the mouth of the corresponding other person. For example, the close-contact detection device 20 calculates a duration of the close-contact state based on a determination result of whether the close-contact state is present in the past and a determination result of whether the close-contact state is present at the present time.

The close-contact detection device 20 proceeds to the process of S18 following S43.

In S18, the close-contact detection device 20 increases the individual close-contact degree as a distance between the head of the evaluation target person and the head of the corresponding other person is short. Further, the close-contact detection device 20 increases the individual close-contact degree as an orientation of the head of the corresponding other person coincides with a direction opposite to an orientation of the head of the evaluation target person. Furthermore, the close-contact detection device 20 increases the individual close-contact degree when the corresponding other person does not wear the mask, compared with when the corresponding other person wears the mask. Furthermore, the close-contact detection device 20 increases the individual close-contact degree when the corresponding other person speaks, compared with when the corresponding other person does not speak.

Furthermore, in S18, the close-contact detection device 20 increases the individual close-contact degree as elapsed time of the close-contact state increases. Furthermore, the close-contact detection device 20 reduces the individual close-contact degree when there is a shield between a position of the head of the corresponding other person and a position of the head of the evaluation target person more than when there is no shield. Thereby, the close-contact detection device 20 increases the individual close-contact degree when there is a high risk of virus infection caused by droplets coming out of the mouth due to vocalization and reduces the individual close-contact degree when there is a high risk of virus infection due to presence of a shield.

For example, the close-contact detection device 20 calculates a time parameter of which value increases as elapsed time of the close-contact state increases. Furthermore, the close-contact detection device 20 calculates a shield parameter of which value is reduced when there is a shield between the position of the head of the corresponding other person and the position of the head of the evaluation target person, and of which value increases when there is no shield. Then, as represented by equation (7), the close-contact detection device 20 calculates the individual close-contact degree by multiplying or adding the distance parameter, the angle parameter, the mask parameter, and the vocalization parameter.

Individual close-contact degree=distance parameter×
angle parameter×mask parameter×vocalization
parameter×time parameter×shield parameter (7)

For example, the time parameter is represented as follows by using elapsed time $T_{elapsed}$ and magnification $M_{time}$ when an average of an individual close-contact degree $S_{crowd}$ of the past elapsed time exceeds a threshold $T_{crowd}$.

$$\text{Time Parameter} = \begin{cases} 1 + M_{time} \cdot t_{elapsed} & \text{if } \frac{1}{n}\sum_{i}^{n} S_{crowd} > T_{crowd} \\ 1 & \text{otherwise} \end{cases} \quad (8)$$

For example, the shield parameter is represented as follows by using a threshold $T_{shield}$ and a degree of confidence $S_{shield}$ indicating whether there is the shield detected in S41 on a straight line connecting the position of the head of another person to the position of the head of the evaluation target person.

$$\text{Shield Parameter} = \begin{cases} T_{shield} - S_{shield} & \text{if } T_{shield} > S_{shield} \\ 0 & \text{otherwise} \end{cases} \quad (9)$$

It is noted that the close-contact detection device 20 is not limited to the calculation method of equation (7) and may calculate the individual close-contact degree by using another method.

By calculating a close-contact evaluation value, the close-contact detection device 20 can provide an observer with a risk that an evaluation target person is virus-infected by droplets coming out of the mouth of another person.

As described above, according to the close-contact detection device 20 of the present embodiment, a close-contact evaluation value indicating a degree of close contact between one or a plurality of other persons and an evaluation target person can be accurately calculated. Furthermore, according to the close-contact detection device 20, by displaying information in accordance with the close-contact evaluation value, a virus infection risk due to droplets coming out of a mouth can be accurately visualized.

Hardware Configuration

Figure 8:
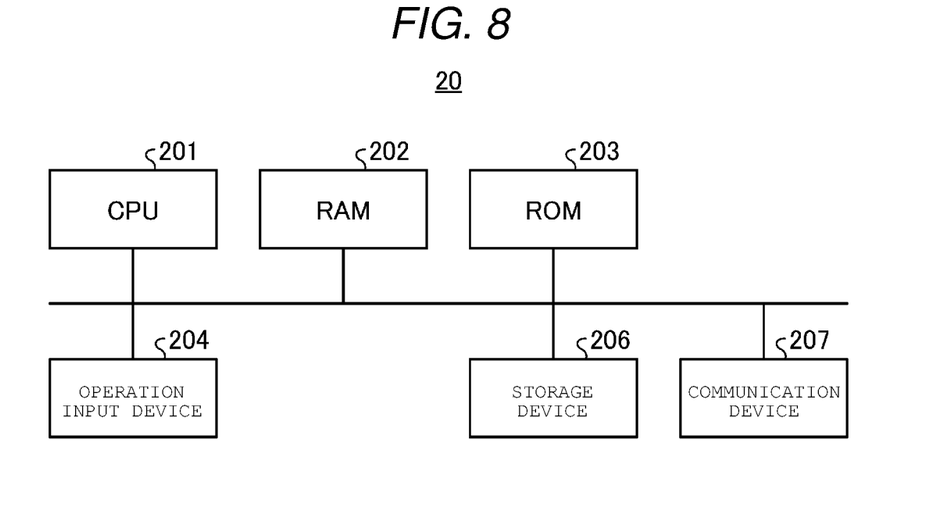
FIG. 8 is a diagram illustrating a hardware configuration of the close-contact detection device.

FIG. 8 is a diagram illustrating an example of a hardware configuration of the close-contact detection device 20 according to the embodiment. The close-contact detection device 20 according to the present embodiment is implemented by, for example, an information processing device having a hardware configuration illustrated in FIG. 8. The close-contact detection device 20 includes a central processing unit (CPU) 201, a random access memory (RAM) 202, a read only memory (ROM) 203, an operation input device 204, a storage device 206, and a communication device 207. Then, each of these parts is connected by a bus.

The CPU 201 is a processor that performs an arithmetic process, a control process, and the like according to a program. The CPU 201 performs various processes in cooperation with a program stored in the ROM 203, the storage device 206, or the like, by using a predetermined region of the RAM 202 as a work region.

The RAM 202 is a memory such as a synchronous dynamic random access memory (SDRAM). The RAM 202 functions as the work region of the CPU 201. The ROM 203 is a memory that stores programs and various types of information in a non-rewritable manner.

The operation input device 204 is an input device such as a mouse or a keyboard. The operation input device 204 receives information input by an operation of a user as an instruction signal and outputs the instruction signal to the CPU 201.

The storage device 206 writes and reads data to and from a storage medium made of a semiconductor such as a flash memory, a magnetically or optically recordable storage medium, or the like. The storage device 206 writes and reads data to and from a storage medium according to a control from the CPU 201. The communication device 207 communicates with an external apparatus via a network according to the control from the CPU 201.

A program executed by the close-contact detection device 20 according to the present embodiment includes an acquisition module, a detection module, a calculation module, and a fishing module. This program is loaded into the RAM 202 and executed by the CPU 201 (processor) to cause an information processing device to function as the acquisition unit 22, the detection unit 24, the calculation unit 26, and the output unit 28. It is noted that the close-contact detection device 20 may have a configuration in which at least a part of the acquisition unit 22, the detection unit 24, the calculation unit 26, and the output unit 28 is implemented by a hardware circuit (for example, a semiconductor integrated circuit).

Further, the program executed by the close-contact detection device 20 according to the present embodiment is a file having a computer-installable format or a computer-executable format and is provided by being recorded on a computer-readable recording medium such as a CD-ROM, a flexible disk, a CD-R, or a digital versatile disk (DVD).

Further, the program executed by the close-contact detection device 20 according to the present embodiment may be stored in a computer connected to a network such as the Internet and may be configured to be provided by downloading via the network. Further, the program executed by the close-contact detection device 20 according to the present embodiment may be configured to be provided or distributed via a network such as the Internet. Further, the program executed by the close-contact detection device 20 may be configured to be provided by being incorporated previously in the ROM 203 or the like.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing device comprising:
a processor programmed to perform an information processing method comprising:
acquiring image data in which an image of a space where a plurality of persons exist is captured;
detecting a position and an orientation of a head of each of the plurality of persons included in the image data in the space;
calculating, for any evaluation target person of the plurality of persons, a close-contact evaluation value indicating a degree of close contact between a head of the evaluation target person and heads of one or a plurality of other persons other than the evaluation target person among the plurality of persons, based on the position and the orientation of the head of each of the plurality of persons; and
displaying information in accordance with the close-contact evaluation value on a display device;
wherein:
the display device displays the image data in which an evaluation object is superimposed on an image of the head of the evaluation target person included in the image data displayed by the display device, and
the evaluation object is an image in which a display content changes according to the close-contact evaluation value.

2. The information processing device according to claim 1, wherein
the display device displays the image data in which a range object is superimposed on the position of the head of the evaluation target person, and
the range object is an image indicating a range of a predetermined distance from the head.

3. The information processing device according to claim 1, wherein
the display device displays the image data in which a direction object is superimposed on the position of the head of the evaluation target person, and the direction object is an image indicating an orientation of the head.

4. The information processing device according to claim 1, wherein
calculating the close-contact evaluation value for the evaluation target person comprises calculating an individual close-contact degree indicating a degree of close contact between the head of the evaluation target person and a head of a corresponding other person, for the one or each of the plurality of other persons, and calculating the close-contact evaluation value by synthesizing the individual close-contact degrees for the one or each of the plurality of other persons.

5. The information processing device according to claim 4, wherein
the individual close-contact degree increases as a distance between the head of the evaluation target person and the head of the corresponding other person is reduced.

6. The information processing device according to claim 4, wherein
the individual close-contact degree increases as an orientation of the head of the corresponding other person coincides with a direction opposite to an orientation of the head of the evaluation target person.

7. The information processing device according to claim 4, wherein
the information processing method further comprises detecting whether each of the plurality of persons wears a mask, and
the individual close-contact degree increases when the corresponding other person does not wear the mask.

8. The information processing device according to claim 4, wherein
information processing method further comprises detecting whether each of the plurality of persons speaks, and
the individual close-contact degree increases when the corresponding other person speaks.

9. The information processing device according to claim 4, wherein
the information processing method further comprises detecting a position of a shield that shields droplets from a mouth, which is included in the image data, and
the individual close-contact degree is reduced when there is the shield between a position of the head of the corresponding other person and a position of the head of the evaluation target person.

10. The information processing device according to claim 4, wherein
the individual close-contact degree increases as a duration of a close-contact state increases, and
the close-contact state is a state in which a position of the head of the corresponding other person is within a predetermined distance from a position of the head of the evaluation target person and in which an orientation of the head of the corresponding other person is within a predetermined angle range with respect to a direction opposite to an orientation of the head of the evaluation target person.

11. An information processing method performed by an information processing device, the method comprising:
the information processing device acquiring image data in which an image of a space where a plurality of persons exist is captured;
the information processing device detecting a position and an orientation of a head of each of the plurality of persons included in the image data in the space;
the information processing device calculating, for any evaluation target person of the plurality of persons, a close-contact evaluation value indicating a degree of close contact between a head of the evaluation target person and heads of one or a plurality of other persons other than the evaluation target person among the plurality of persons, based on the position and the orientation of the head of each of the plurality of persons; and
displaying information in accordance with the close-contact evaluation value on a display device;
wherein:
the display device displays the image data in which an evaluation object is superimposed on an image of the head of the evaluation target person included in the image data displayed by the display device, and
the evaluation object is an image in which a display content changes according to the close-contact evaluation value.

12. The information processing method according to claim 11, wherein
when calculating the close-contact evaluation value for the evaluation target person, an individual close-contact degree indicating a degree of close contact between the head of the evaluation target person and a head of a corresponding other person is calculated for the one or each of the plurality of other persons, and
the close-contact evaluation value is calculated by synthesizing the individual close-contact degrees for the one or each of the plurality of other persons.

13. A non-transitory computer-readable recording medium storing a program that is executed by an information processing device, the program causing the information processing device to perform an information processing method comprising:
acquiring image data in which an image of a space where a plurality of persons exist is captured;
detecting a position and an orientation of a head of each of the plurality of persons included in the image data in the space;
calculating, for any evaluation target person of the plurality of persons, a close-contact evaluation value indicating a degree of close contact between a head of the evaluation target person and heads of one or a plurality of other persons other than the evaluation target person among the plurality of persons, based on the position and the orientation of the head of each of the plurality of persons; and displaying information in accordance with the close-contact evaluation value on a display device; wherein: the display device displays the image data in which an evaluation object is superimposed on an image of the head of the evaluation target person included in the image data displayed by the display device, and the evaluation object is an image in which a display content changes according to the close-contact evaluation value.

14. The non-transitory computer-readable recording medium according to claim 13, wherein calculating the close-contact evaluation value for the evaluation target person, comprises:
calculating an individual close-contact degree indicating a degree of close contact between the head of the evaluation target person and a head of a corresponding other person, for the one or each of the plurality of other persons, and calculating the close-contact evaluation value by synthesizing the individual close-contact degrees for the one or each of the plurality of other persons.

15. The information processing method according to claim 11, wherein
the display device displays the image data in which a range object is superimposed on the position of the head of the evaluation target person, and
the range object is an image indicating a range of a predetermined distance from the head.

16. The information processing device according to claim 11, wherein
the display device displays the image data in which a direction object is superimposed on the position of the head of the evaluation target person, and
the direction object is an image indicating an orientation of the head.

17. The information processing method according to claim 12, wherein
the information processing method further comprises detecting whether each of the plurality of persons wears a mask, and the individual close-contact degree increases when the corresponding other person does not wear the mask.

18. The non-transitory computer-readable recording medium according to claim 13, wherein the display device displays the image data in which a range object is superimposed on the position of the head of the evaluation target person, and the range object is an image indicating a range of a predetermined distance from the head.

19. The non-transitory computer-readable recording medium according to claim 13, wherein the display device displays the image data in which a direction object is superimposed on the position of the head of the evaluation target person, and the direction object is an image indicating an orientation of the head.

20. The non-transitory computer-readable recording medium according to claim 14, wherein the information processing method further comprises detecting whether each of the plurality of persons wears a mask, and the individual close-contact degree increases when the corresponding other person does not wear the mask.

\* \* \* \* \*